C. E. SPAULDING.
MEANS FOR MAKING REINFORCED FIREPROOF PARTITIONS, &c.
APPLICATION FILED MAR. 2, 1914.
1,176,255.
Patented Mar. 21, 1916.
5 SHEETS—SHEET 1.
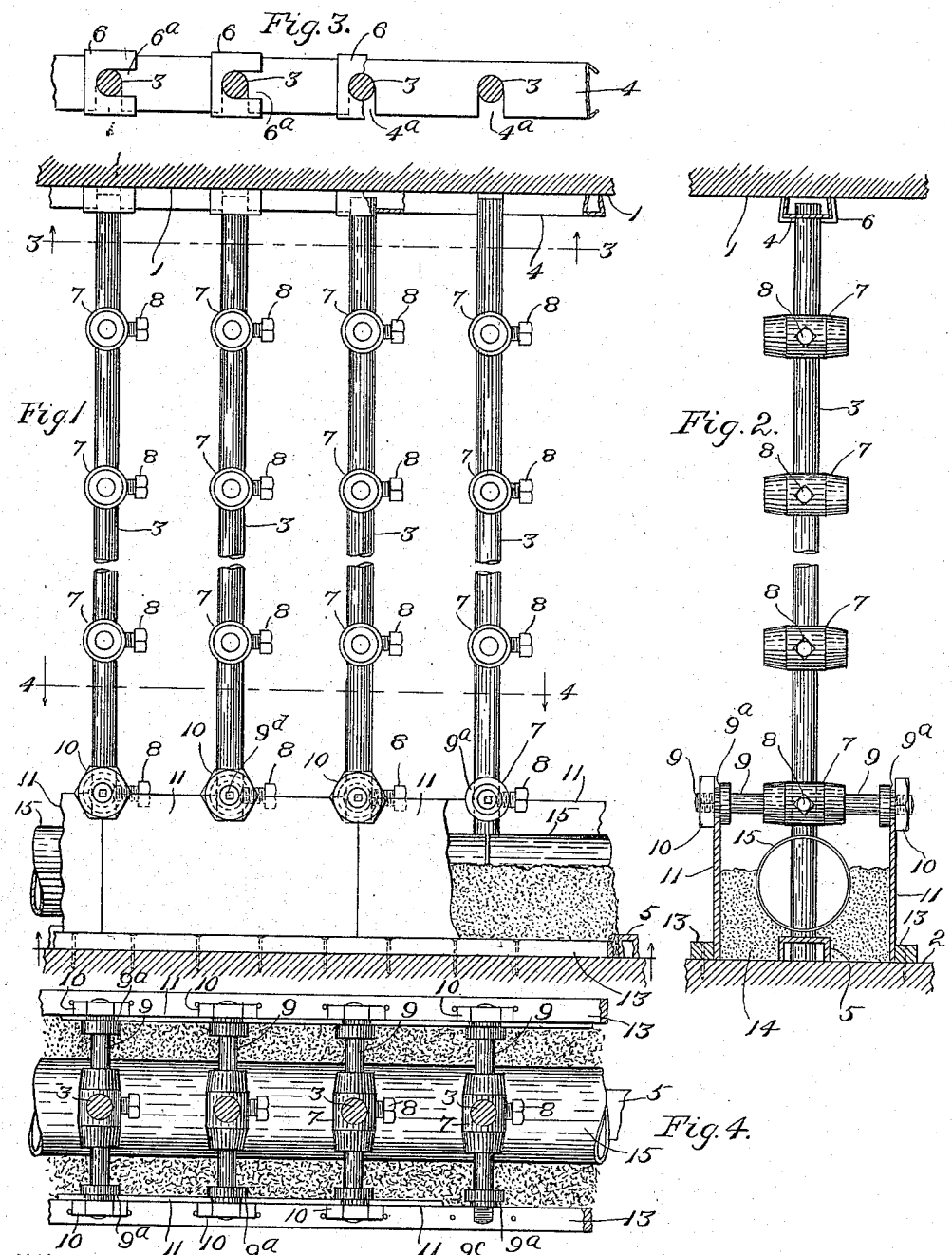

C. E. SPAULDING.
MEANS FOR MAKING REINFORCED FIREPROOF PARTITIONS, &c.
APPLICATION FILED MAR. 2, 1914.
1,176,255.
Patented Mar. 21, 1916.
5 SHEETS—SHEET 2.
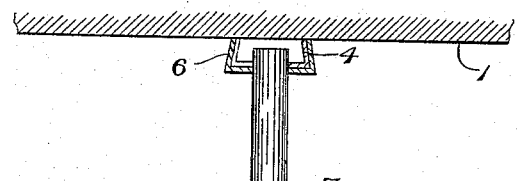
Fig. 5.
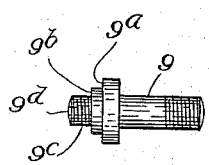
Fig. 8.
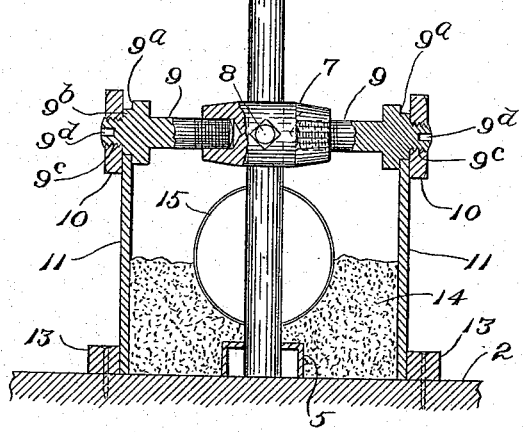
Fig. 6.
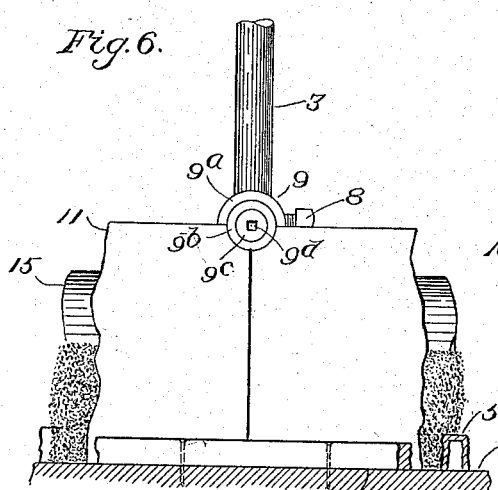
Fig. 7.
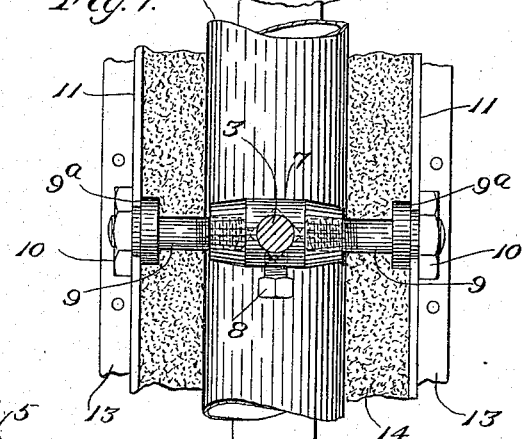
Witnesses:
Oscar F. Hill
Ellen O. Spring
Inventor:
Carl E. Spaulding
by Chas. F. Randall
Attorney.

C. E. SPAULDING.
MEANS FOR MAKING REINFORCED FIREPROOF PARTITIONS, &c.
APPLICATION FILED MAR. 2, 1914.
1,176,255.
Patented Mar. 21, 1916.
5 SHEETS—SHEET 3.
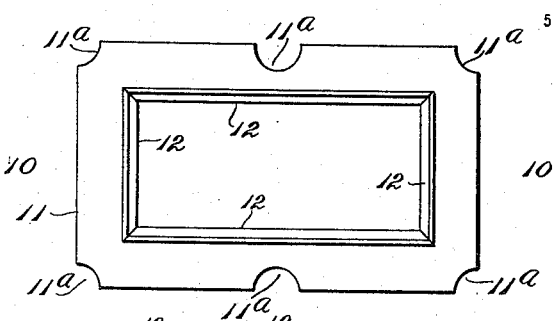
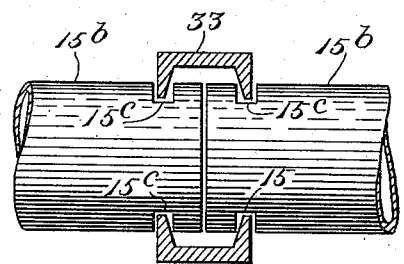
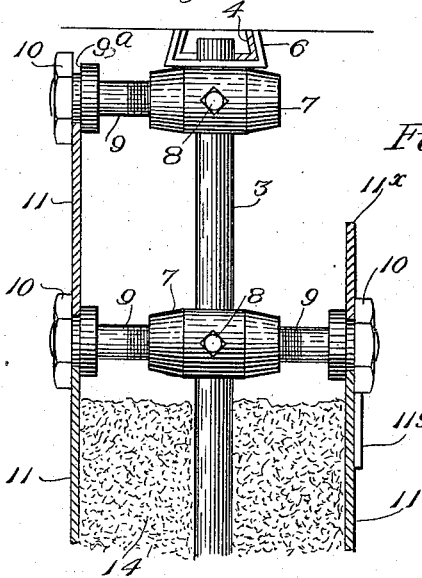
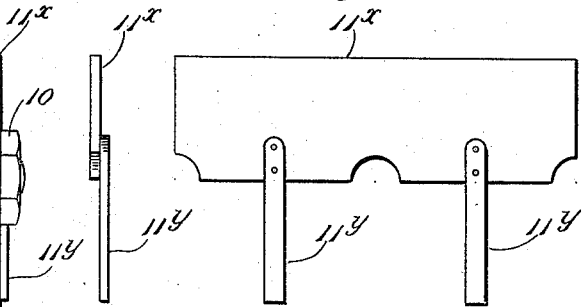
Witnesses:
Oscar F. Hill
Ellen O. Spring
Inventor:
Carl E. Spaulding
by Chas. F. Randall
Attorney.

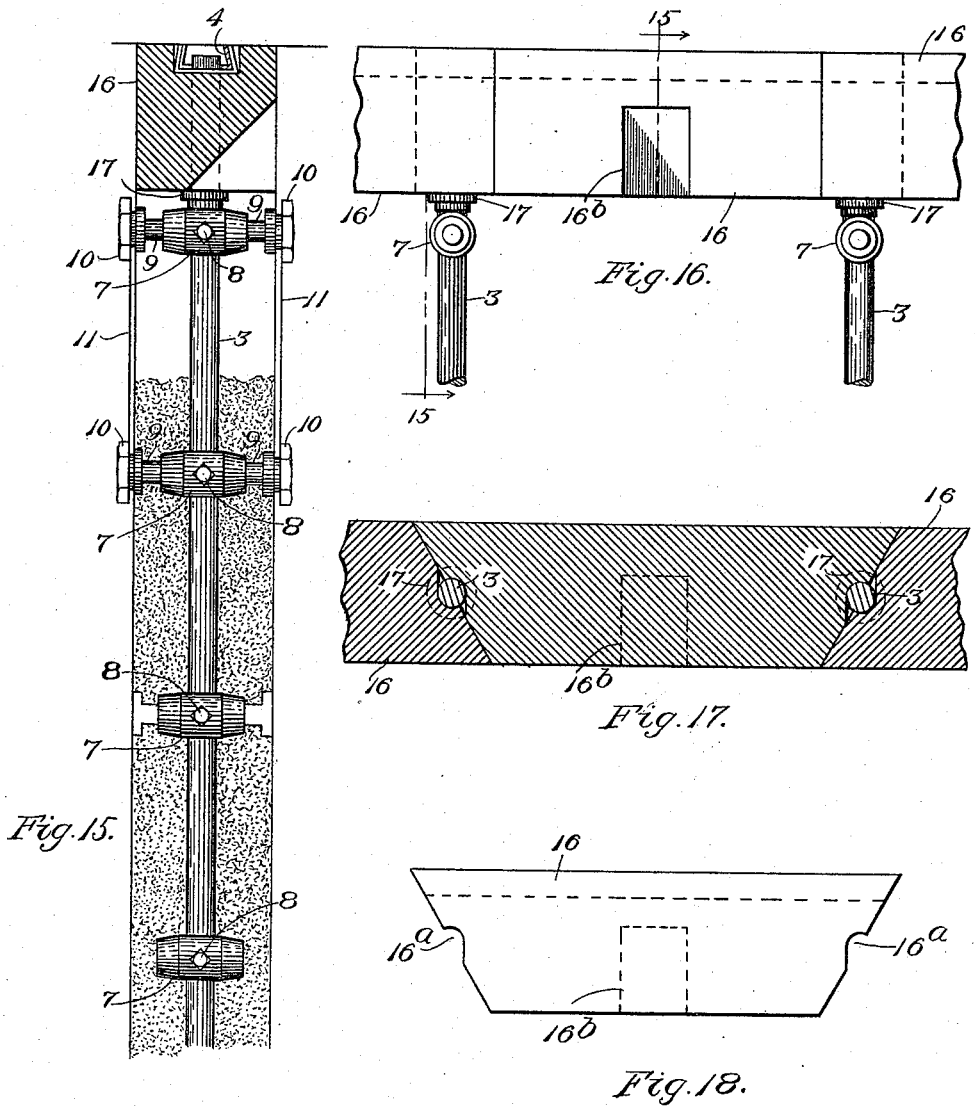

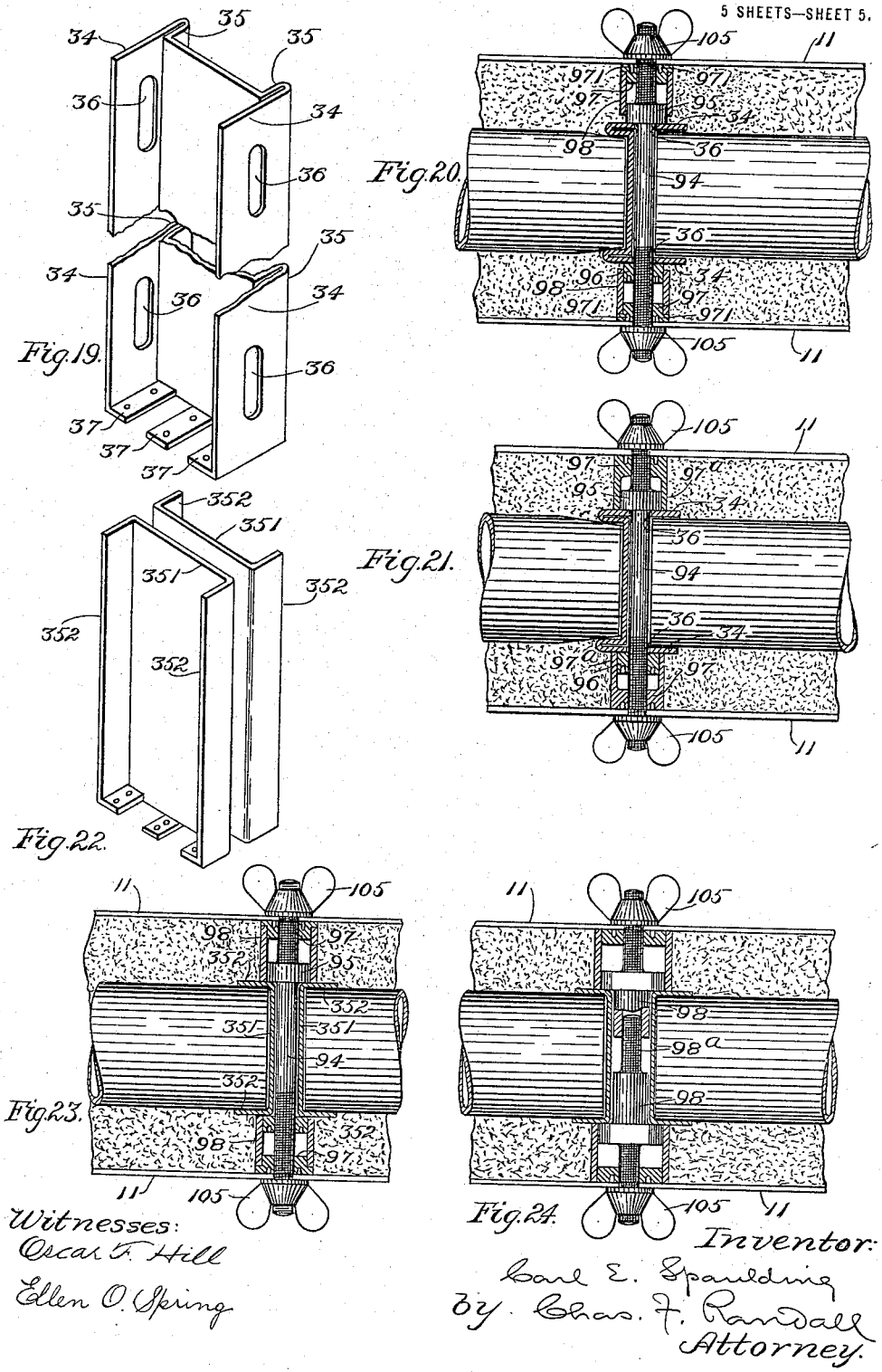

UNITED STATES PATENT OFFICE.

CARL E. SPAULDING, OF NEW YORK, N. Y.

MEANS FOR MAKING REINFORCED FIREPROOF PARTITIONS, &c.

1,176,255. Specification of Letters Patent. Patented Mar. 21, 1916.

Application filed March 2, 1914. Serial No. 821,857.

*To all whom it may concern:*

Be it known that I, CARL E. SPAULDING, a citizen of the United States, residing at New York, in the county of New York, State of New York, have invented a certain new and useful Improvement in Means for Making Reinforced Fireproof Partitions, &c., of which the following is a specification, reference being had therein to the accompanying drawings.

The invention has relation to means for making and reinforcing fireproof partitions, walls, and other reinforced concrete work.

General objects of the invention are to facilitate the making or building of the said structures: to enable better results than heretofore to be attained in the construction thereof; to lessen the cost by reducing the amount of material required; to lessen the cost in connection with the actual building operations, especially by enabling the customary built-up external wooden forms to be dispensed with; to reinforce the said structures, and by reason of the reinforcement enable the thickness to be reduced without sacrifice of strength, stability or safety; and to provide for retaining the reinforcing elements in their proper positions without tendency to displacement.

In accordance with the invention I employ a series of members constituted of rods, beams, or tubes, which I dispose within the space of the contemplated thickness of the partition, wall, or the like structure to be built. The said members may be of any approved shape and size in cross-section, suitable to the requirements imposed by the character, location, and purposes of the partition, wall, or other structure to be built. In many instances they may consist of simple small cylindrical rods. The said members serve two purposes, first, that of assisting in holding in position the simplified external forms which I employ for confining the plastic material and shaping the surface or surfaces of the partition, wall, or like structures, and secondly, as permanent reinforcing elements remaining within the finished wall, or the like. For the first purpose mentioned, I provide, in conjunction with said members, attachments by means of which the said external forms are conveniently connected with such members and positioned with reference thereto. Preferably, I make provisions for adjustment of the forms to enable the thickness of the partition, wall, or the like, to be varied, as well as the distance between the internal reinforcements and either surface of the partition, etc. Usually, in the case of a partition or wall, the said members are employed in a vertical position, in order, among other reasons, to give strength to withstand crushing force acting vertically, as in consequence of the superimposed weight of an overhead ceiling and floor, or roof. Where such result does not have to be provided for, the position of the members may be other than vertical.

My improved means for making reinforced fireproof partitions, etc., comprise, therefore, the members aforesaid adapted to be disposed within the space to be occupied by the thickness of the partition, wall, or like structure to be built, attachments engaging with the said members and with the external forms, and the said external forms.

The invention also provides for the employment of cores, and the properly locating the said cores in position within the partition or other structure.

Various embodiments of the features of the invention are shown in the drawings, in which latter,—

Figure 1 shows in side elevation a series of the members aforesaid, together with the means of retaining the same in position, portions of opposite courses of forms, means connected with the said members for holding the said forms in position, and a series of cores and a quantity of plastic material between the forms and partially embedding the cores, the ceiling and floor being partly represented in section, certain portions of different parts being broken away to show features that would otherwise be concealed. Fig. 2 is a view of the parts shown in Fig. 1, representing them as in vertical cross-section. Fig. 3 is a view in horizontal section on line 3, 3, of Fig. 1 looking upward. Fig. 4 is a view in horizontal section on line 4, 4, of Fig. 1, looking downward. Fig. 5 is a view on an enlarged scale in vertical cross-section, showing portions of the form-retaining devices broken away to illustrate the construction more clearly. Fig. 6 shows in side elevation the parts at the bottom in Fig. 5. Fig. 7 is a view showing in plan the parts which are represented in Fig. 6. Fig. 8 is a view showing separately one of the bolts 9. Fig. 9 is an elevation and Fig. 10 is a longitudinal section of one of the forms. Fig. 11 is a view showing a modified construction of supporting members or struts and manner of engagement with cores. Fig. 12 is a sectional view illustrating the means of providing for building-in the top of a partition. Fig. 13 is an elevation and Fig. 14 is an end view of the narrow form-plate shown at the right-hand side in Fig. 12. Fig. 15 is a sectional view illustrating another mode of forming the topmost portion of a partition. Fig. 16 is a view showing in side elevation certain parts of Fig. 15 comprising a series of ceiling blocks and the upper portions of two of the studs 3, 3. Fig. 17 is a view in horizontal section through the ceiling blocks of Fig. 16. Fig. 18 is a plan view of one of the ceiling blocks of Figs. 15, 16 and 17. Fig. 19 is an isometric view representing a modified form of stud or strut. Fig. 20 is a view in horizontal section of a stud or strut like that of Fig. 19, and a form-support adapted for use in connection therewith, and illustrates the employment of the said parts in the production of a partition or wall. Fig. 21 is a view similar to Fig. 20, showing a slight modification in connection with the form-support. Fig. 22 is an isometric view illustrating a double stud. Figs. 23 and 24 are views corresponding in character with Figs. 20 and 21 and showing different forms of form-supports in connection with the double stud of Fig. 22.

In Fig. 1, which illustrates the employment of the invention in the production of a partition, the ceiling line is indicated at 1, and the floor line at 2. A series of the members aforesaid is represented at 3, 3, 3. In this instance, the said members are shown as cylindrical rods of small diameter, and are arranged in vertical position, parallel with one another, which is the preferred arrangement where permissible. As thus disposed, the members 3, 3, etc., correspond with the so-called studs that are employed in building construction, and for convenience of reference the said members, whether specifically rods, beams, or tubes, and whatever the cross-sectional shape thereof, are hereinafter termed studs. In some cases the manner and means of holding the members or studs 3, 3, etc., in place prior to the application of plastic material may vary according to circumstances.

One means of preliminarily securing vertical studs in place is shown in Figs. 1 to 8, such means forming a separate specific feature of the invention. This means comprises what, for convenience of designation, I term shoes, they consisting of longitudinal strips, one of which 4, is applied to the ceiling and fixed in place along the line of the contemplated partition in some convenient manner, and the other, 5, is applied to the floor in the line of the said partition and conveniently fixed in place. The two shoes 4 and 5 are constructed for engagement and coöperation with respective studs, at the upper and lower ends of the latter, so as to keep the studs spaced apart properly with relation to one another, and also keep them upright and prevent them from falling sidewise. To this end, the two shoes shown in the drawings are formed, respectively, with openings which receive the upper and lower ends, respectively, of the studs. The openings in the floor-shoe 5 are in this instance holes of a size to conveniently receive the lower ends of the studs, permitting the said ends to be dropped into the said holes; while for greater convenience in assembling the parts in position the openings in the ceiling-shoe 4 are slots 4ª, 4ª, etc., extending in from one side of the said shoe 4, to permit the upper ends of the studs to enter by a swinging transverse movement after the lower ends have been dropped into the holes of the floor-shoe. The construction of the shoes may vary more or less in practice, and so may the material of which they are made. They are here shown as made of sheet-metal bent into trough shape, and with the edges of the sides or flanges of the troughs making contact with the ceiling and floor, respectively. In some cases in practice any convenient provision may be made for guarding against escape of the upper ends of the studs from the openings of the ceiling-shoe by an outward swinging movement, and also against displacement of the said ends within the said openings. Preferably, however, as one special feature of invention, I employ clips 6, 6, etc., formed of sheet-metal, each clip having its opposite side-portions bent to fit against the sides or flanges of the ceiling-shoe, the intermediate or body-portion having an open slit 6ª extending in the direction of the length of the ceiling-shoe and just large enough to receive the diameter of a stud. The respective clips 6, 6, are applied by placing a clip upon the ceiling-shoe from beneath, at a point adjacent the stud with which it is to coöperate, and then sliding the clip along the ceiling-shoe with the open end of the slot 6ª foremost so as to cause the slotted clip to embrace the stud, as shown in Fig. 3, and thereby prevent it from transverse swinging movement within the slot of the ceiling-shoe. A convenient means of securing the clip in place upon the ceiling-shoe is shown in Figs. 2 and 5, and consists in causing the wings or flanges of the ceiling-shoe to incline inward toward each other so that the distance between their free edges is less than the width of the body of the shoe, thereby giving the shoe a dovetail shape in cross-section, so that by bending the sides or wings of the clip inward against the wings or flanges of the shoe as in Figs. 2 and 5 the clip is held in place and prevented from dropping from the shoe.

In practice, the studs are located at about thirty inches apart, more or less, and fastened at the floor or ceiling either by the means described above or in other approved manner.

As a part of the particular means for holding the forms in position which is illustrated in Figs. 1 to 7, I provide blocks 7, 7, etc., having holes therethrough from top to bottom which enable them to be slipped upon the respective studs, a number of the said blocks being applied to each stud, one above another, as shown, and the respective blocks on a stud being adjustably fixed in position upon the stud by means of clamping screws 8, 8. Each of these blocks has opposite internally-threaded openings, which are indicated best in Figs. 5 and 7. Another part of the said means for holding said forms in position consists of form-supports which are removably engaged with said blocks, and by their engagement with the forms serve to hold the latter in place. In the present instance these form-supports are in the form of stems or bolts 9, 9, etc., one of which is shown separately in Fig. 8, the said form-supports having screw-threaded inner ends which screw into the internally-threaded oppositely located holes in the respective blocks 8, 8, etc., so that a pair of said stems or bolts projects in opposite directions from each block, transversely of the thickness of the contemplated partition. Each of the stems or bolts is provided with a shoulder 9$^a$ at a short distance from its outer end, and beyond such shoulder it is formed with a plain cylindrical portion 9$^b$, the latter being succeeded by a screw-threaded portion 9$^c$ of convenient length to receive a nut or nuts 10.

To provide for turning the stems or bolts 9, 9, as may be required in screwing their inner ends into or out of the internally-threaded holes of the blocks 7, 7, upon the upright studs 3, 3, in applying the stems or bolts to the said blocks or removing them therefrom, as well as in adjusting the stems or bolts in or out, the outer ends of the stems or bolts are conveniently shaped for the engagement therewith of a wrench or other tool. In the drawings, the said ends are shown as having square holes or recesses 9$^d$, 9$^d$, therein to receive the correspondingly-shaped end of a convenient key.

The forms which I employ consist of flat sheets 11, 11, having the requisite stiffness, and may consist of wood or metal, the latter material being preferred. In applying the forms 11, 11, to the form-supports, margins of the forms are placed against shoulders 9$^a$, 9$^a$, of the stems or bolts, and upon the application of the nuts 10, 10, and the tightening up of the said nuts, are clamped between the said nuts and the said shoulders and thereby secured in place.

The forms shown in the drawings are thin metal plates, steel being a convenient material for such plates. The form-plates, whether of wood or metal, may be of a thickness sufficient to give them the requisite stiffness, although to save cost I sometimes employ thinner plates which I reinforce on their outer faces along the edges and elsewhere, either longitudinally or transversely, or both, so as to secure proper stiffness. Figs. 9 and 10 show a form-plate which is stiffened both longitudinally and transversely, as just referred to, by means of strips 12, 12, of angle iron. In the case of wooden form-plates, reinforcements properly applied will obviate tendency to warping, and will lessen or prevent breakage from rough handling. Form-retaining devices on the order of those shown herein enable these forms to be used repeatedly, which works a great saving as compared with the use of built-up forms made of planks cut to meet the requirements of the particular use thereof. The latter forms are injured by the use thereof, and are seldom used a second time. When discarded, the value of the material is very much lessened. Consequently their cost is usually figured into the cost of the job. I make my forms in short lengths, as for instance of a length corresponding with the measurement between centers from one stud to the stud which is one remove therefrom. See Fig. 1. A series or course of the said forms will be placed together end to end in line lengthwise of the partition or the like to be produced, at each side of the series of members or studs, 3, 3, etc. This use of forms in short sections, fitted together end to end to constitute a course, enables them to be assembled to suit a partition, wall, or the like of any desired length, and obviates the inconvenience and expense of forms of a single piece equaling in length the length of the partition or the like. The vertical width of the forms will be determined by the vertical height of the portion of partition or the like which it is desired or practical to produce at one pouring of the plastic material.

The engagement of the forms with the form-supports may be variously effected in carrying the invention into effect. In the case of the particular construction of form-supports shown in the drawings, I prefer to notch the edges of the forms as shown at 11ª, 11ª, Fig. 9, to partly receive the cylindrical portions 9ᵇ, 9ᵇ, adjoining the shoulders of a horizontal series of the said form-supports, as in the case of the upper edges of the form-plates shown in Figs. 1 and 2. Also, in order that the notches of the lower edge or edges of an upper course of form-plates may be subsequently engaged with the same cylindrical portions from above, permitting the lower portions of the second course to be secured tightly in place by means of the same form-supports and nuts as the lower course, with the said lower edges in close contact with the upper edges of the lower course, the notched upper edges of this upper course of form-plates being engaged with the next higher horizontal series of form-supports and secured in position thereby.

In practice, form-plates are first placed in position at the bottom of the series of studs, at opposite sides of the latter, and secured in place at their upper edges through the engagement of a series of form-supports with the said edges. The lower edges of the said form-plates may be secured against spreading apart in any convenient manner, as by nails driven into the flooring alongside the same, or by strips 13, 13, Figs. 1 to 7, nailed to the flooring. The thickness of the wall will be determined by the distance between the oppositely-placed form-plates, and this distance may be varied to secure the required thickness of wall by adjustment of the form-supports inward or outward relative to the blocks mounted on the studs. This mode of adjustment also enables the form-plates at either side of the series of studs to be located at the required distance from the said series of studs, which distance may be either greater or less than that between the opposite form-plates and the series of studs. The lowermost form-plates having been properly secured in position, plastic material 14 is placed between them so as to cover the floor-shoe 5, and surround and embed the said shoe and the lower portions of the studs. A second course of form-plates is next applied to the form-supports at each side of the series of studs, with the lower edges thereof resting upon the edges of the previously applied course of form-plates. To permit this to be effected, the nuts in connection with the form-supports engaging with the upper edges of the lowermost form-plates are loosened so as to permit the notched lower edges of the upper form-plates to be fitted down around the shoulders of the said form-supports, and then are tightened so as to clasp the lower margins of the upper course of form-plates. The upper edges of the upper form-plates are engaged with the cylindrical portions of the next higher series of form-supports, and secured in position by tightening up the nuts upon the latter form-supports. The space between the upper pair of courses of form-plates having been filled with plastic material, a third pair is applied and secured in position by means of form-supports and the nuts thereon, and so on until close to the ceiling. The blocks of the form-supports are adjustable vertically upon the studs to enable them to be located on the studs at heights suitable to correspond with the vertical widths of the forms.

When it is desired to employ hollow forms or cores, 15, 15, etc., as sometimes is the case in order to secure lightness, render the walls sound-proof, increase the fire-resisting quality of the partition, and also effect a reduction in the amount of plastic material employed, which reduces the weight, these may be applied as illustrated in the drawings. In the latter, the cores are made in short lengths corresponding with the distance between one stud and the next. In the process of building the partition, the space between an opposite pair of courses of form-plates is partly filled with the plastic material, a horizontal line or series of cores is placed upon the layer of plastic material and partly embedded therein, and then plastic material is filled in around and above the said series of cores, other cores being applied and embedded above the first in obvious manner. To properly position the cores within the partition with the aid of the studs, the ends of the cores may be notched at 15ª, 15ª as shown in Fig. 7, so that the notches in one end of a given core will receive one-half, more or less, of the diameter of the adjacent stud, and the notches of the adjoining end of the next succeeding core fitting the same stud will receive the remaining one-half, more or less, of the said diameter. Thereby, the studs serve to position the said cores within the thickness of the partition, and prevent displacement of the same transversely toward either surface.

Fig. 11 illustrates a modified form of stud, and a different mode of engagement between the same and the hollow cores. In this figure, a pair of studs 33, 33, is employed in place of a single cylindrical stud as already described. These studs 33, 33, are respectively trough-shaped, and have their hollow sides and flanges turned inward so that the hollow side and flanges of one stud of a pair face those of the other. The cores, 15ᵇ, 15ᵇ, have notches 15ᶜ, 15ᶜ, cut in them at opposite points at each end of a core, and the ends of the cores are engaged with the studs by inserting such ends between the two studs of a pair and causing the inturned flanges of the studs to enter and occupy the oppositely located slots in the said ends.

By procedure substantially as set forth above, the building up of the partition may be carried on to a point close to the ceiling. The top of the partition then may be built in by applying, as shown in Fig. 12, a course of form-plates 11 at one side of the partition, with the top edges of such form-plates as close as possible to the ceiling, and fixing the said form-plates in place by means of form-supporting devices. Also, applying at the opposite side of the partition a course of form-plates 11$^x$ like the form-plate shown separately in Figs. 13 and 14, with the top edges of the said form-plates 11$^x$ located at a sufficient distance below the ceiling to permit the plastic material to be poured in over the said stop edges. See Fig. 12. After the space between the form-plates 11$^x$ and the opposite form-plates 11 has been filled up to the top edges of the form-plates 11$^x$, and after the plastic material has set and the form-plates at both sides have been removed, the partition may be completed by filling in by hand so as to close the gap existing next to the ceiling.

The form-plate 11$^x$ of Figs. 12, 13 and 14 is held in place by means of the form-supports 9 and nuts 10 which engage with the top-edges of the next lower course of form-plates 11 at the same side of the partition, the bottom edges of the form-plates 11$^x$ being notched to fit the said form-supports as illustrated by Figs. 13 and 14. For the purpose of holding the form-plates 11$^x$ steadily in their upright position and preventing them from being pressed outward by the plastic mass, the said form-plates are provided with extensions 11$^y$, 11$^y$, in the form of cleats, which extend down below the lower edges of the form-plates 11$^x$, so that when the latter are applied in working position as in Fig. 12 the said steadying extensions or cleats make contact with the outer faces of the adjacent course of form-plates 11.

Another mode of forming the topmost portion of a partition is illustrated in Figs. 15 to 18. This mode involves the employment of previously prepared blocks 16, 16, of plastic material, which are mounted upon the upper ends of the studs 3, 3, etc., next to the ceiling line. The said blocks may be supported in any convenient manner in close contact with the ceiling line, as for instance by collars 17, 17, applied to the studs and resting upon the blocks 7, 7, of the form-supports. Or the said blocks 7, 7, themselves may be set up closely and firmly against the bottoms of the ceiling blocks, and employed to support the latter without the use of additional collars. For the purpose of facilitating the application of these ceiling blocks to the series of studs in case it is desired to make such application after the studs have been placed in position, the ceiling blocks may be made in sections corresponding approximately in length with the distance between two adjacent studs, each section with beveled ends as shown in Figs. 17 and 18, so that by applying the said sections from opposite sides of the partition, introducing them between the studs and fitting their oppositely-inclined beveled ends together as shown in Figs. 16 and 17, a closely joined continuous course of ceiling blocks will be produced. The beveled ends of the sections or blocks are notched as at 16$^a$, 16$^a$, Figs. 17 and 18, to fit around the studs 3, 3, so that the meeting ends of adjoining blocks may make contact with each other. It will be obvious that the ceiling-block sections may be utilized to hold the upper ends of the studs properly spaced apart and in alinement without the employment of the ceiling shoe. In this case, the blocks will be fastened to the ceiling or otherwise held in place so as to prevent transverse or other displacement of the same. When the ceiling blocks are employed in conjunction with the ceiling shoe, they usually will be recessed as shown in Fig. 15 to fit around and accommodate the ceiling shoe. The ceiling blocks having been applied in position, and being properly supported in such position, courses of form-plates 11, 11, are applied as shown in Fig. 15 at opposite sides of the partition so as to close the opening between the last-poured portion of the partition and the ceiling blocks. The space inclosed between the said form-plates is filled with plastic material by a pouring operation, provision for the pouring being made by forming in the lower portion of each section or block a pouring-opening 16$^b$ through which the plastic material may flow into the said space. After the portion of plastic material thus poured has set, and after the removal of the form-plates 11, 11, the pouring-openings in the ceiling blocks may be filled with plastic material applied by hand.

In practice, the form-plates are removed as the work proceeds and as successive sections one above the other are completed and after they have properly set. The studs 3, 3, however, and the floor-shoe and ceiling-shoe, when the same are employed, remain embedded in the partition. The blocks 7, 7, when they are employed, remain within the partition. The form-supports, are unscrewed from the blocks 7, 7, and withdrawn at the sides of the partition, the holes left in the sides of the partition by the withdrawal of the form-supports being filled in by hand.

I may employ ceiling blocks a little thinner than the contemplated thickness of the partition, and, after securing the same in place and forming the partition by the pouring operation up to the lower edge of the ceiling blocks, apply the requisite plastic material by hand to the opposite side-faces of the said blocks so as to fill in at both sides of the blocks flush with the poured portion of the partition below the ceiling blocks.

The form-supporting stems or bolts 9, 9, of a pair of the said stems or bolts are independently adjustable lengthwise in the direction of the thickness of the partition or wall. This enables the collars $9^a$, $9^a$, thereof, and the opposite forms 11, 11, in Figs. 2 and 5, for instance, to be set at any required distance apart from each other to provide for making a partition or wall of the desired thickness. It also enables either of the said forms to be set nearer to or farther from the studs 3, 3, than the other thereof, wherever for any reason such setting is desired. This capacity for independent individual adjustment of the said collars enables them to be adjustable to compensate for any misplacing of the respective studs, and for any want of straightness of the respective studs. Thus, if the studs should not be in a straight line with one another, or if any of them should be bent, the want of alinement and the lack of straightness may be compensated for by the adjustment in question. Thereby, the forms may be caused to aline with one another in a horizontal course, and may be made plumb vertically.

Fig. 19 shows another form of stud, which may be employed in cases where the somewhat greater cost does not preclude such employment. The said stud is made of sheet metal, preferably steel, and in cross-sectional shape corresponds more or less closely with an I-beam. One pair of wings thereof, 34, 34, is somewhat wider than the other pair, 35, 35, and is formed with longitudinal slots 36, 36, to permit of the application of the form-supports to the studs. The said slots are located at distances apart vertically corresponding approximately with the required spacing of the form-supports one above another. The slots 36, 36, are of sufficient length vertically to give sufficient leeway in setting the form-supports higher or lower to suit the positions of the edges of the form-plates. For the purpose of enabling the I-shaped stud of Fig. 19 to be fixed in position, the respective ends thereof are provided, as shown in connection with the lower end thereof, in Fig. 19, with horizontally projecting lugs 37, 37, having holes through which nails may be driven downward into the support beneath the foot of the stud, and upward into the support above the upper end of the stud. Fig. 20 shows applied to a strut like that of Fig. 19 a form-support of convenient character for use therewith, such form-support being in the shape of a stem or bolt 94 having both end-portions thereof screw-threaded, and the said stem or bolt having also a fixed collar 95 located adjacent one screw-threaded end-portion thereof. The said stem or bolt is passed through an oppositely-located pair of the slots 36, 36, in the wider wings of the stud, with the fixed collar 95 in contact with the outer surface of one of the said wings and the opposite threaded end-portion extending through the slot in the opposite wing and projecting beyond the said wing. A nut 96 is screwed upon the threaded end-portion last mentioned, and up tightly against the outer surface of the said opposite wing. By the engagement of collar 95 and nut 96 with the outer surfaces of the two wings 34, 34, the said form-support is fixedly mounted in connection with the stud.

Upon each of the opposite screw-threaded end-portions of each stem or bolt 94 is screwed a nut 97 constituting an adjusting and clamping collar for form-plates 11. The said form-plates are placed against the outer faces of the respective nuts 97, 97, and are clamped thereagainst by means of wing-nuts 105, 105, which are screwed upon the screw-threaded end-portions of the stem or bolt. By screwing the nuts 97, 97, inward or outward upon the screw-threaded end-portions of the stem or bolt the positions of the form-plates may be adjusted as required to vary the thickness of the partition or the distance of the form-plates at either side of the partition from the studs. To facilitate the screwing of the nuts 97, 97, onto and off from the threaded portions of the stem or bolt and also the making of adjustments, the said nuts are formed at their outer faces with holes 971, 971, adapted to be entered by projections of a suitable tool for turning the nuts. The removal of the form-plates from the partition is provided for by taking off the wing-nuts from the end-portions of the stems or bolts of the form-supporting devices. It is intended that the nut 96 shall be unscrewed and removed from the corresponding end-portion of the stem or bolt, and that then the stem or bolt shall be withdrawn endwise from the partition. To provide for this unscrewing and removal of the said nut, and withdrawal of the stem or bolt, I make provision in suitable manner for preventing the plastic material from closing in against the end-portions of the stem or bolt and the collar and nuts thereon. Any convenient shields may be employed for the purpose.

Fig. 20 shows sections of rubber tubing 98, 98, one thereof placed respectively around the fixed collar and embracing the reduced portion of the adjacent clamping and adjustment nut 97, and the other thereof placed around the nut 96 and the inner reduced portion of the adjacent clamping and adjustment nut 97. These tubular shields prevent the plastic material from closing in against the screw-threaded end-portions of the stem or bolt and covering over the collar 95 and nut 96. Thereby, after the removal of the opposite clamping nuts 97, 97, free access to the nut 96 is permitted, and it is possible to unscrew and remove said nut and then withdraw the stem or bolt, without interference from the plastic material. The sections of rubber tubing may then be removed from the holes in the opposite faces of the partition, after which the said holes may be filled in by hand.

Fig. 21 shows a construction in which instead of the rubber shields of Fig. 20 I employ inwardly extending flanges 97$^a$, 97$^a$, which are formed upon the adjustment and clamping nuts 97, 97. These flanges extend inward and encircle the fixed collar 95 and the securing nut 96, so as to inclose the same more or less completely in the different positions of adjustment of the nuts 97, 97.

It will be observed that when the clamping and adjustment nuts 97, 97, are adjusted inward from their position in Fig. 20 the tubular rubber shields will compress lengthwise. Also, that as the nuts 97, 97, of Fig. 21 are adjusted inward or outward upon the stem or bolt the flanges thereof move inward or outward relative to the exteriors of the fixed collar 95 and the securing nut 96.

Fig. 22 shows what may be termed a double stud composed of two trough-shaped strips 351, 351, of sheet-metal placed back to back with their flanges 352, 352, facing in opposite directions. When such a double stud is employed in making a partition or wall, the two members thereof are secured in position back to back, with the flanges of the respective members facing in opposite directions lengthwise of the contemplated partition or wall, and with the said backs separated by a space or interval sufficient to receive between them the intermediate portion of the stem or bolt 94 of a form-supporting device, as in Fig. 23, in which the fixed collar 95 and the securing nut 96 are shown in engagement with the flange ends of both members of the double stud.

Fig. 24 shows the double stud of Figs. 22 and 23 as having employed in connection therewith another form of form-support. This form of form-support is made in two sections, 98, 98, each having a screw-threaded outer portion, a fixed collar to take against the adjacent ends of the double members of the stud, and an inner portion to enter between the backs of the members of the double stud. One of the said inner portions is formed with the reduced screw-threaded extension 98$^a$, and the other is interiorly bored and threaded to receive the said extension. The parts are applied and fitted together as shown in Fig. 24, being screwed together until their collars fit snugly against the opposite flanged ends of the two members of the double stud. The clamping and adjusting nuts are then applied to the threaded portions, and the inclosing tubular shields are slipped over the nuts and fixed collars. The form-plates 11, 11, are applied against the exterior faces of the nuts and are clamped to the same by means of the nuts as in Fig. 19.

When cores are employed their ends are introduced between the flanges of the studs of Figs. 19 to 24 in the manner shown in Fig. 20, and thereby the cores are properly held in position within the thickness of the partitions.

I claim as my invention:—

1. Means for use in making reinforced partitions, walls, etc., comprising a series of members disposed within the space of the contemplated thickness of the partition or wall to be built, external forms for confining the plastic material and surface-shaping the partition or wall, the said forms having notched edges, and means in connection with the said internal members extending transversely relative to the same and to the said thickness, detachably engaging with the said members, seating themselves in the said notches, and detachably holding the said forms from spreading apart.

2. Means for use in making reinforced partitions, walls, etc., comprising a series of reinforcing members for the partition or wall to be built, disposed within the space of the contemplated thickness of the said partition or wall, external forms for confining the plastic material and surface-shaping the partition or wall, and attachments comprising inner members fixedly attached to said reinforcing members and outer members detachably mounted in connection with the said inner members and detachably engaging with said forms both internally and externally and thereby holding the latter in position.

3. Means for use in making reinforced partitions, walls, etc., comprising a series of reinforcing members for the partition or wall to be built, disposed within the space of the contemplated thickness of the said partition or wall, external forms for confining the plastic material, inner members fixedly attached to the said reinforcing members and outer members detachably attached to said inner members, detachably engaging and supporting said forms both internally and externally and adjustable in the direction of the thickness of the partition or wall.

4. Means for use in making reinforced partitions, walls, etc., comprising a series of reinforcing members for the partition or wall to be built, disposed within the space of the contemplated thickness of the said partition or wall, external forms for confining the plastic material, and a plurality of series of form-supporting means comprising inner members rigidly mounted upon the said reinforcing members at heights corresponding with successive positions, one above the other, of the said forms, and adapted to remain embedded in the partition or wall, and outer members detachably connected to the said inner members and detachably engaging with said forms both internally and externally to hold the latter in position.

5. Means for use in making partitions, walls, etc., comprising a series of supporting members, disposed within the space of the contemplated thickness of the partition or wall to be built, external forms for confining the plastic material, and means for detachably connecting said forms with the said members in successively higher positions as successive portions of the height of the wall are built up comprising transversely extending bolts removably engaging with the said supporting members and also detachably engaging by their outer portions with the said forms.

6. Means for use in making partitions, walls, etc., comprising a series of supporting members, disposed within the space of the contemplated thickness of the partition or wall to be built, blocks mounted upon said members at successive heights, external forms for confining the plastic material, and means for detachably connecting said forms with the said blocks in successively higher positions as successive portions of the height of the wall are built up.

7. Means for use in making partitions, walls, etc., comprising a series of vertical supporting members, disposed within the space of the contemplated thickness of the partition or wall to be built, external forms for confining the plastic material, and transversely extended form-supports adapted to be detachably connected with the said members at different points in the height of the partition, wall, etc., and removable by transverse withdrawal, and also adapted for detachable engagement by their outer portions with the said forms and serving to connect the forms with the said members in successively higher positions.

8. Means for use in making partitions, walls, etc., comprising a series of supporting members, disposed within the space of the thickness of the contemplated partition or wall to be built, retaining means having pockets or seats receiving the upper and lower ends of said members and serving to keep the latter in upright position, external forms for confining the plastic material, and form-supports adapted to be detachably connected with the said members at different points in the height of the partition, wall, etc., and also adapted for detachable engagement with the said forms and serving to connect the forms with the said members in successively higher positions.

9. Means for use in making partitions, walls, etc., comprising a series of supporting members, a floor-shoe and a ceiling-shoe having pockets or seats receiving respectively the upper ends and lower ends of said members and keeping the members in position, external forms for confining the plastic material, and means for detachably connecting said forms with the said members in successively higher positions as successive portions of the height of the wall are built up.

10. Means for use in making partitions, walls, etc., comprising a series of supporting members, a floor-shoe and a ceiling-shoe having pockets or seats receiving respectively the upper ends and lower ends of said members and keeping the members in position, external forms for confining the plastic material, and form-supports adapted to be detachably connected with the said members at different points in the height of the partition, wall, etc., and also adapted for detachable engagement with the said forms and serving to connect the forms with the said members in successively higher positions.

11. Means for use in making partitions, walls, etc., comprising supporting members, disposed within the space of the thickness of the partition or wall to be built, external forms, form-supports mounted upon said members extending transversely of the said thickness and provided with shoulders to position external forms placed against such shoulders, said form-supports having screw-threaded outer portions, and nuts screwing upon said outer portions and clamping edge-portions of the forms against said shoulders and thereby fastening said forms in working position.

12. Means for use in making partitions, walls, etc., comprising supporting members, disposed within the thickness of the partition or wall to be built, external forms, form-supports mounted upon said members and provided with shoulders to position external forms placed against such shoulders, said form-supports adjustable in the direction of the thickness of the partition, wall, etc., and having screw-threaded outer portions, and nuts screwing upon said outer portions and clamping edge-portions of the forms against said shoulders and thereby fastening said forms in working position.

13. Means for use in making partitions, walls, etc., comprising a series of upright studs, external forms, form-supports by means of which said external forms may be removably supported from said studs in successively higher positions, ceiling-blocks fitting the upper portions of said studs, and means adapted for supporting the ceiling-blocks in position upon the studs until the plastic material adjacent the ceiling-blocks is in place.

In testimony whereof I affix my signature in presence of two witnesses.

CARL E. SPAULDING.

Witnesses:
CHAS. F. RANDALL,
NATHAN B. DAY.

Copies of this patent may be obtained for five cents each, by addressing the "Commissioner of Patents, Washington, D. C."